United States Patent
Brabek et al.

(10) Patent No.: US 6,409,481 B1
(45) Date of Patent: Jun. 25, 2002

(54) HERMETICALLY ENCAPSULATED COMPRESSOR

(75) Inventors: Walter Brabek, Jennersdorf; Josef Hirtzi, Bad Waltersdorf, both of (AT)

(73) Assignee: Verdichter Oe. Ges,m.b.H., Fürstenfeld (AT)

( * ) Notice: Subject to any disclaimer, the term of this patent is extended or adjusted under 35 U.S.C. 154(b) by 0 days.

(21) Appl. No.: 09/601,065

(22) PCT Filed: Jan. 27, 1999

(86) PCT No.: PCT/AT99/00020

§ 371 (c)(1), (2), (4) Date: Jul. 12, 2000

(87) PCT Pub. No.: WO99/39425

PCT Pub. Date: Aug. 5, 1999

(30) Foreign Application Priority Data

Jan. 28, 1998 (AT) ................................. 134/98

(51) Int. Cl.[7] .......................... F04B 17/00; F04B 35/00
(52) U.S. Cl. ....................................... 417/363; 417/312
(58) Field of Search ................. 417/312, 360, 417/363, 368, 415, 372, 53; 29/156.5 R

(56) References Cited

U.S. PATENT DOCUMENTS

| | | | | |
|---|---|---|---|---|
| 3,600,111 A | * | 8/1971 | Rogers | 417/312 |
| 4,406,590 A | * | 9/1983 | Kessler | 417/360 |
| 4,547,131 A | * | 10/1985 | Riffe et al. | 417/53 |
| 4,559,686 A | * | 12/1985 | Kessler | 29/156.5 R |
| 4,601,644 A | * | 7/1986 | Gannaway | 417/363 |
| 4,718,830 A | * | 1/1988 | Middleton et al. | 417/372 |
| 5,160,247 A | * | 11/1992 | Kandpal | 417/415 |
| 5,205,723 A | * | 4/1993 | Kawai et al. | 417/415 |
| 5,328,338 A | * | 7/1994 | Hirano et al. | 417/312 |
| 5,499,908 A | * | 3/1996 | Schmitz | 417/368 |
| 5,762,479 A | * | 6/1998 | Baars et al. | 417/312 |

FOREIGN PATENT DOCUMENTS

| | | |
|---|---|---|
| GB | 2 005 925 | 4/1979 |
| WO | WO 98/16000 | 4/1988 |

OTHER PUBLICATIONS

Patent Abstracts of Japan, vol. 007, No. 115, May 19, 1983, JP 58033954, Matsushita Denki Sangyo KK, Feb. 28, 1983.

* cited by examiner

*Primary Examiner*—Teresa Walberg
*Assistant Examiner*—Leonid M Fastovsky
(74) *Attorney, Agent, or Firm*—Collard & Roe, P.C.

(57) ABSTRACT

A hermetically encapsulated compressor with a closed winding head for use in small-size refrigerating installations with a compressor housing in which a cylinder housing (10) with an extension (25) and an electromotor (6) are arranged which are mutually fastened to one another and which rest on the compressor housing by means of supports (4, 20, 19). In order to provide an alternative manner of adjusting and testing the air gap which allows performing a precise adjustment of the air gap even when a closed winding head is used it is provided that the extension (25) of the cylinder housing (10) is provided with breakthroughs (13) through which the cylindrical jacket of a mounting tool (24) can be inserted for assembling and positioning the crankshaft (3), the cylinder housing (10) and the rotor (1) with the stator (8).

5 Claims, 4 Drawing Sheets

HERMETICALLY ENCAPSULATED COMPRESSOR

CROSS REFERENCE TO RELATED APPLICATIONS

Applicants claim priority under 35 U.S.C. 119 of Austrian Application No. A 134/98, filed on Jan. 28, 1998. Applicants also claim priority under 35 U.S.C. 120 of PCT/AT99/00020, filed on Jan. 27, 1999. The international application under PT article 21(2) was not published in English.

Such compressors consist of an electromotor which drives a crankshaft. The latter is connected via a connecting rod with a piston which compresses the refrigerating agent, with both being received by a cylinder housing with an extension. The arrangement of the electromotor is made either above or below the cylinder housing including the extension. An important requirement in compressors where the electromotors are arranged below the cylinder housing including the extension is the adherence to a safety distance between the supports arranged on the one face side of the electromotor, on which supports rest the electromotor and, consequently, the cylinder housing including the extension, and a winding head arranged on the same face side. The size of said winding head is a decisive constructional feature concerning the shape and the size of the entire compressor housing in this zone and concerning the amount of used copper wire not only with respect to the safety distance to the supports in such compressors whose electromotor is disposed below the cylinder housing including the extension, but also in respect of such compressors whose electromotor is arranged above the cylinder housing including the extension. Moreover, the size and the shape of the compressor housing of such encapsulated compressors which enclose the electromotor and the cylinder housing are in a direct relationship with the sound emitted by and the strength of said housing.

Single-phase asynchronous motors are used as electromotors in compressors of refrigerating installations according to the state of the art. A crankshaft is fixed in a central pass-through bore of the rotor of said electromotor, which crankshaft projects with its one end zone beyond the one face side of the rotor and is held with its other end zone in an extension of the cylinder housing which is arranged adjacent to the other face side of the rotor, with the part of the extension of the cylinder housing which forms the bearing for the crankshaft being arranged as a cylindrical bush which projects into an also central bore in the rotor of the electromotor. A connecting rod and, consequently, a piston are driven at the end zone of the crankshaft which is located in the extension of the cylinder housing. The crankshaft is provided with bores for supplying oil to the bearing and the other sliding surfaces in the cylinder housing.

When the electromotor is arranged below the cylinder housing including the extension, supports are preferably resiliently arranged on the stator of the electromotor, namely on the face side averted from the extension, which stator is arranged in the assembled state in such a way that the rotational axis of the body of revolution stands perpendicularly. The supports rest on the compressor housing and compensate the jolts and oscillations occurring during the compression. The supports are generally arranged as flat coil springs in which a pin fastened to the compressor housing engages from below and which on their upper side engage in fastening means which are arranged on the face side of the stator. The flat coil springs must be arranged in such a way that a specific safety distance can be maintained between them and the winding head of the stator which is also arranged on this face side. In the majority of compressors according to the state of the art the windings in the two stator winding heads are substantially led along arcs of a circle, so that they are arranged substantially circularly on the face side of the stator, with the inner diameter of the stator, which corresponds to the diameter of the rotor plus a required air gap, not being inwardly overlapped by any wire of the winding head. This is necessary since a mounting tool by which the rotor together with the crankshaft and the cylinder housing plus extension are guided during the mounting is pulled through the cylindrical hollow chamber of the stator for fixing the position of the stator with respect to the rotor and the extension of the cylinder housing, thus producing the setting of the air gap.

Particularly where more powerful refrigerating agent compressors are concerned it is not possible without additional components to maintain the safety distance between the supports and the stator winding head due to its size and the necessity that the interior diameter of the stator bore must not be exceeded by the winding of the winding head. It is therefore necessary to arrange additional distance plates on the fastening elements on the face side of the stator which is averted from the extension of the cylinder housing, which distance plates radially place the supports further away from the rotational axis of the stator and thus allow maintaining a larger distance between the supports and the winding head of the stator.

In the case of arranging the electromotor above the cylinder housing including the extension, the supports are arranged on and support the same and subsequently seal the electromotor from the compressor housing.

As a result of the very high production numbers of such compressors, additional components will lead to very high additional expenditure in the production. Moreover, it is necessary to further bulge the compressor housing in the zone of the resilient supports, thus making it substantially larger and also heavier. The thus obtained larger housing surfaces will benefit noise emissions, thus making the compressor louder during operation.

The required power of the electromotor and thus the quantity of copper will increase with rising refrigerating capacity, as has already been mentioned.

A minority of the compressors in accordance with the state of the art are provided with a winding head whose winding wires are guided along the chords of the rotor cross section (closed winding head).

As a result of this special type of winding of the winding head the same extends in a face area of the stator over a major part of the clear diameter of the stator, thus requiring considerable less space than the conventional type of winding over the circumference of the stator and producing more space towards the outer diameter of the stator, thus providing the same for the supports and avoiding having to displace the same radially further outwardly with additional plates. It is thus possible to build the compressor housing narrower in the zone of the supports of the electromotor and the winding head which is also arranged in this zone, thus reducing the weight of the housing as well as its need for space. The height of the compressor wall also decreases, thus reducing the sound emission surface area.

These kinds of compressors according to the state of the art entail the problem, however, of testing and setting the air gap by means of a test device or mounting tool. Such test devices or mounting tools are substantially provided with a thickness which corresponds to the thickness of the air gap. This test is performed from below in known compressors with closed winding heads, i.e. from the side of the stator which is averted from the cylinder housing.

The air gap can only be accessed with difficulty from this side, however, so that a test of the same is only possible at only a very few selected points. In order to enable precise testing of the air gap it is necessary to have a respectively high angular coverage of the circumference of the air gap. The tighter the winding of the closed winding head is performed the more difficult the testing and setting of the air gap from the side of the stator which is averted from the cylinder housing.

It is the object of the present invention to provide an alternative type of adjusting and testing the air gap which allows performing a precise adjustment of the air gap even in a closed winding head.

This object is achieved by a compressor of the kind mentioned above by the characterizing features of claim 1.

In this way the testing and setting of the air gap can be performed from the side of the cylinder housing including the extension, with a precise positioning of the crankshaft, the cylinder housing including the extension, the rotor and the stator being enabled. Moreover, a substantially cylindrical mounting tool can be used for testing and setting the air gap, which tool covers the major part of the air gap and thus achieves a high angular coverage.

The feature of claim 2 allows achieving in a simple manner a particularly precise positioning of the mounting tool in the cylinder housing including the extension, and thus a precise setting of the air gap.

It is a further object of the present application to provide two methods for assembling and positioning a stator with the rotor, crankshaft and the cylinder housing including the extension, which stator is provided with the winding head in accordance with the invention. Conventional methods which provide the assembly through the face side of the stator on which the supports are arranged cannot be performed in a stator with a closed winding head because any insertion of the rotor into the centric stator bore is prevented by the special arrangement of the winding head.

In accordance with claim 3 the mounting of the stator therefore occurs with the rotor, the crankshaft and the cylinder housing including the extension via the face side of the rotor facing the cylinder housing by means of a mounting tool of the known kind which is removed again in the reverse direction after fixing the stator in its position and setting the air gap. The method in accordance with the invention is required in order to perform an assembly of the compressor with a winding head in accordance with the invention.

Claim 4 discloses a second advantageous possibility for assembling a compressor in accordance with the invention. The assembly is also performed via the side of the stator facing the cylinder housing including the extension, since the averted side is blocked by the winding head in accordance with the invention. In contrast to claim 1, the arrangement of breakthroughs in the extension of the cylinder housing for inserting a cylindrical mounting tool is not required.

The invention is now explained in closer detail by reference to an embodiment illustrated in the drawings, wherein.

Figure 1:
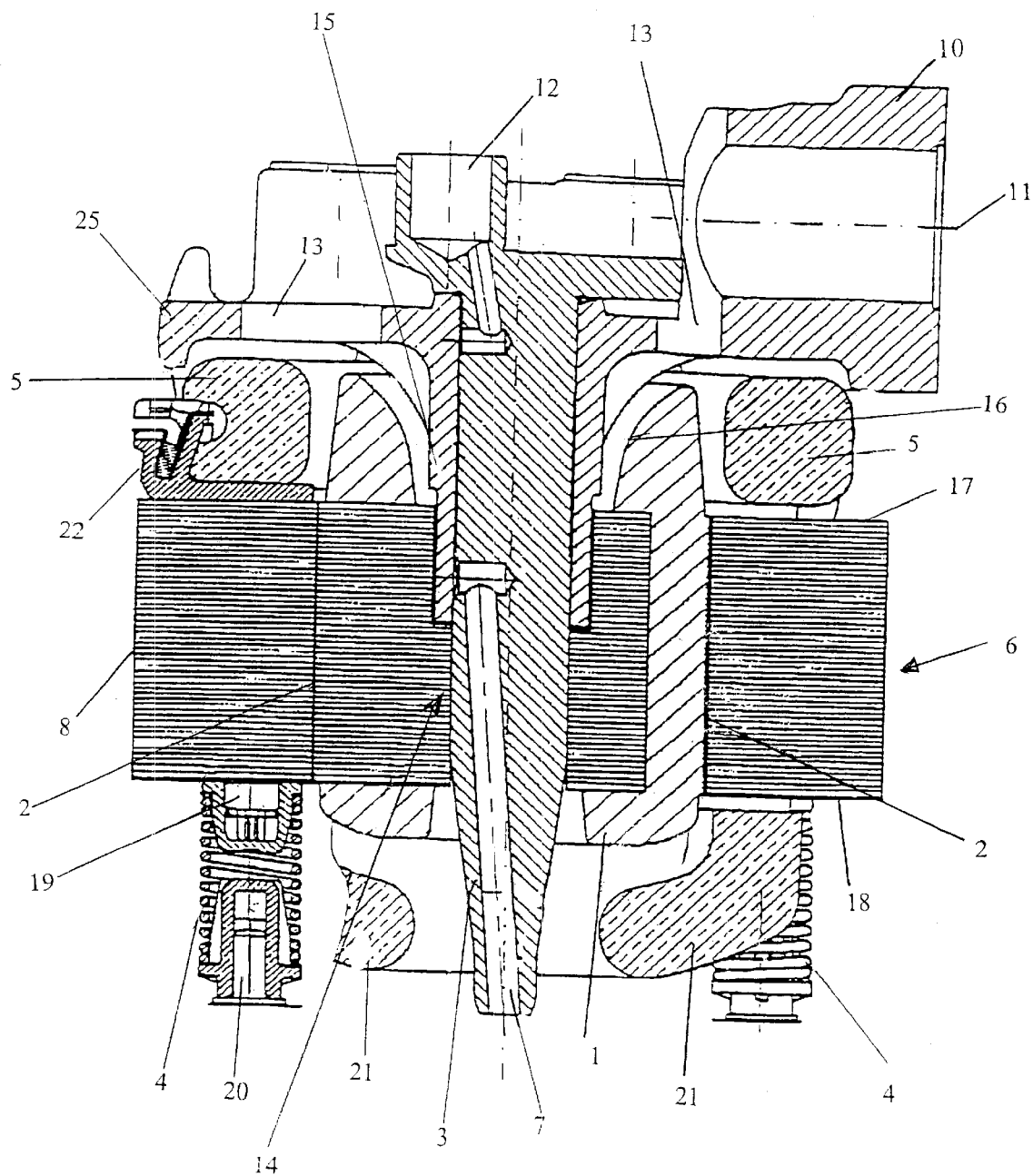
FIG. 1 shows a sectional view through a compressor in accordance with the invention.

FIG. 1 shows a sectional view through a compressor in accordance with the invention. An extension 25, which is provided with breakthroughs 13, of the cylinder housing 10 holds a crankshaft 3 perpendicular to the cylinder axis 11, with the bearing location 15 of the extension 25 projecting into a centric bore 16 of a rotor 1 of an electromotor 6. A connecting rod bearing 12 is arranged at the upper end of the crankshaft 3 by means of which a connecting rod (not shown) and, subsequently, a piston (not shown) are driven. Crankshaft 3 is provided with lubricating oil bore 7 and is fixed in the zone 14 on rotor 1. A stator 8 encompasses rotor 1, separated by an air gap 2. A winding head 5 is arranged at the face side 17 of the stator 8 which faces the cylinder housing, which winding head is guided substantially along the circumference of stator 8 and whose power connection is made through a terminal board 22. The winding head 21 in accordance with the invention and fastening apparatuses 19 are arranged on the face side 18 of stator 8 which is averted from the extension 25 of the cylinder housing 10, which fastening apparatuses engage in compression spring elements 4, which on their part engage in pins 20 arranged on the floor of the compressor housing.

When arranging the electromotor above the cylinder housing including the extension, the supports are arranged on the same accordingly. For the purpose of illustrating this arrangement, FIG. 1 can be rotated about 180° and the supports can be mirrored about a horizontal straight line onto the downwardly facing upper side of the cylinder housing including the extension.

Figure 2A:
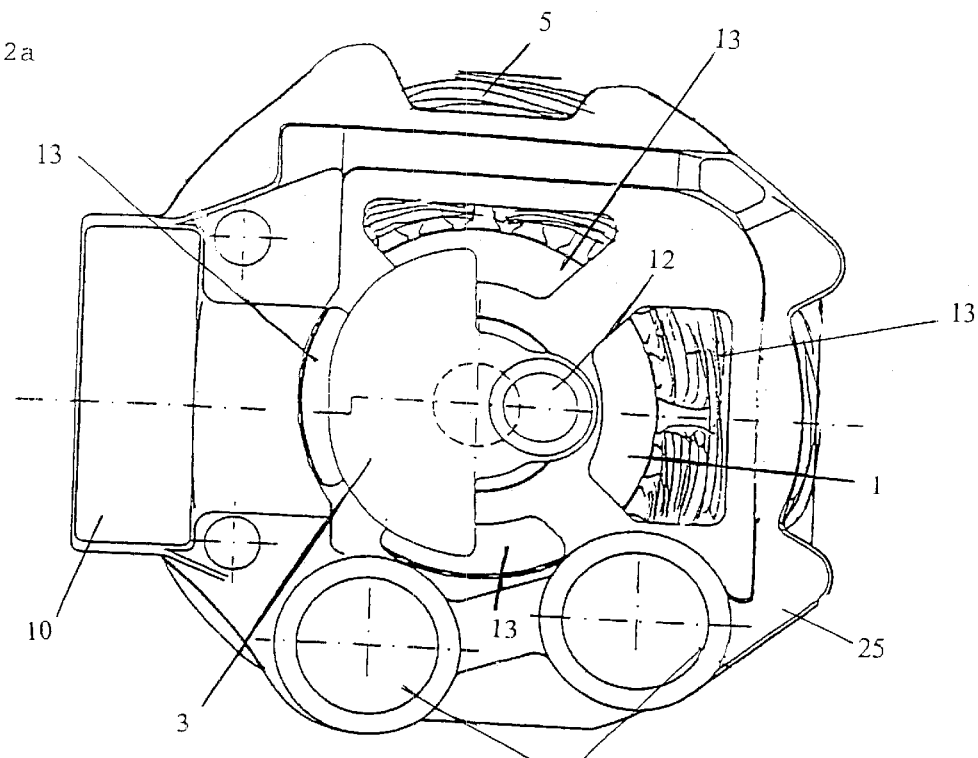
FIG. 2a shows a top view of a compressor in accordance with the invention.
Figure 2B:
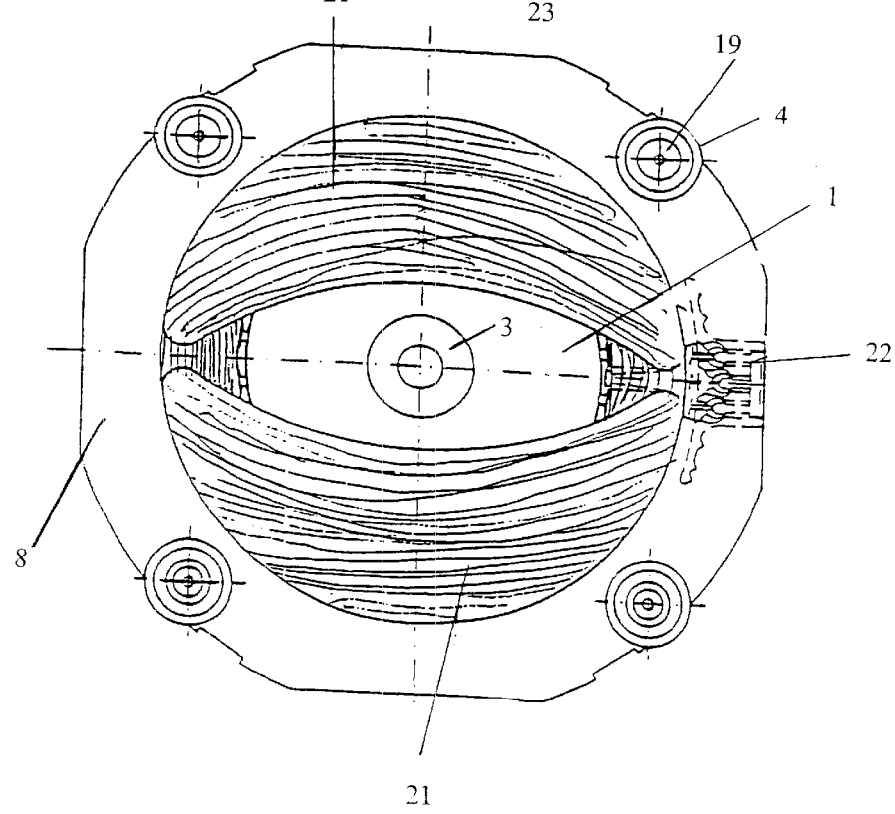
FIG. 2b shows a bottom view of a compressor in accordance with the invention without a cylinder housing plus extension.

FIGS. 2a and 2b show a top and bottom view of a compressor in accordance with the invention, with the bottom view not illustrating the cylinder housing including the extension. The breakthroughs 13 for inserting the mounting tool 24 are very clearly recognizable here, as are the pressure sound chambers 23 and the special arrangement of the stator winding head 21. In order to ensure a precise setting of the air gap it is advantageous that the interruptions of the break-throughs 13 cover not more than 20 degrees of the circumference of the air gap.

Figure 3:
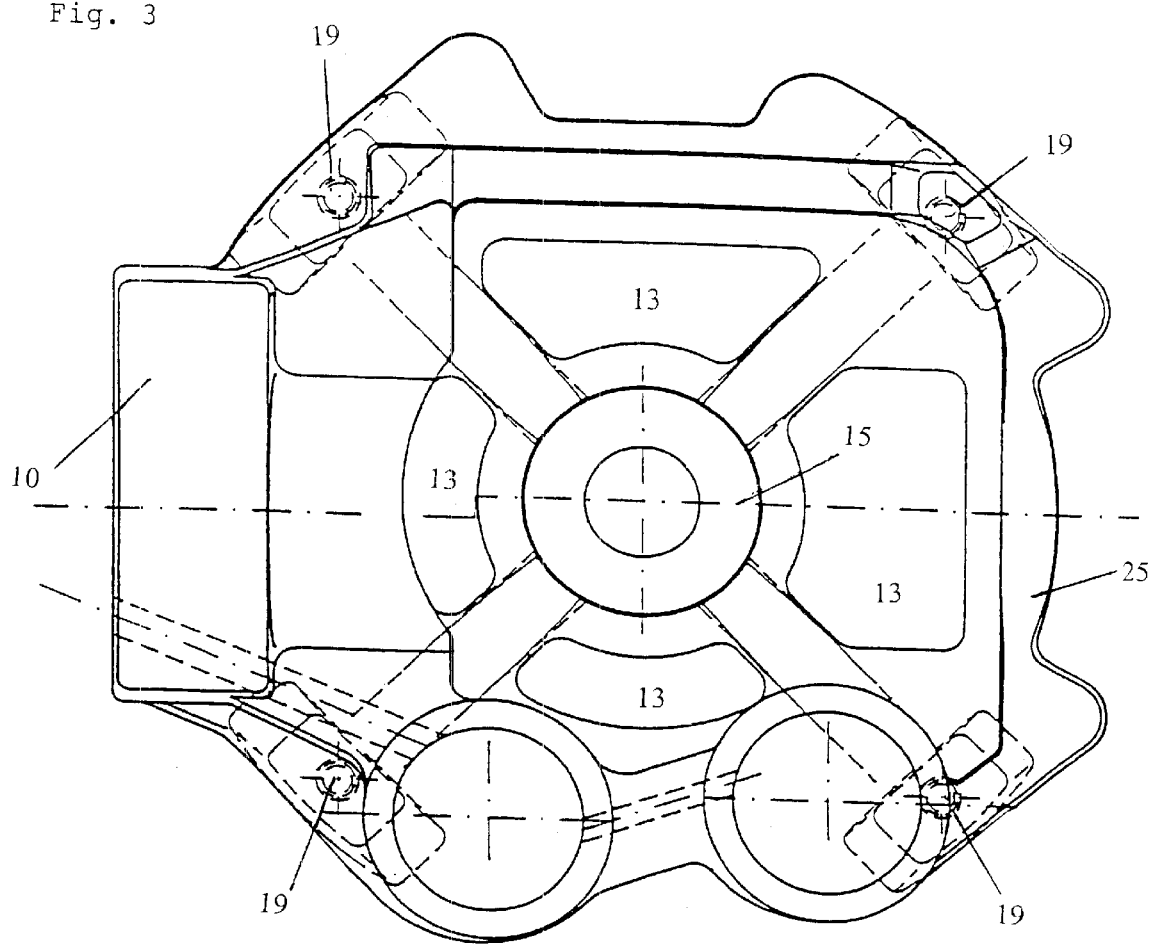
FIG. 3 shows a view of a cylinder housing in accordance with the invention.

FIG. 3 shows a top view of a cylinder housing 10 in accordance with the invention. The break-throughs 13 are arranged concentrically around the centrally arranged bearing location 15 of the crankshaft.

Figure 4:
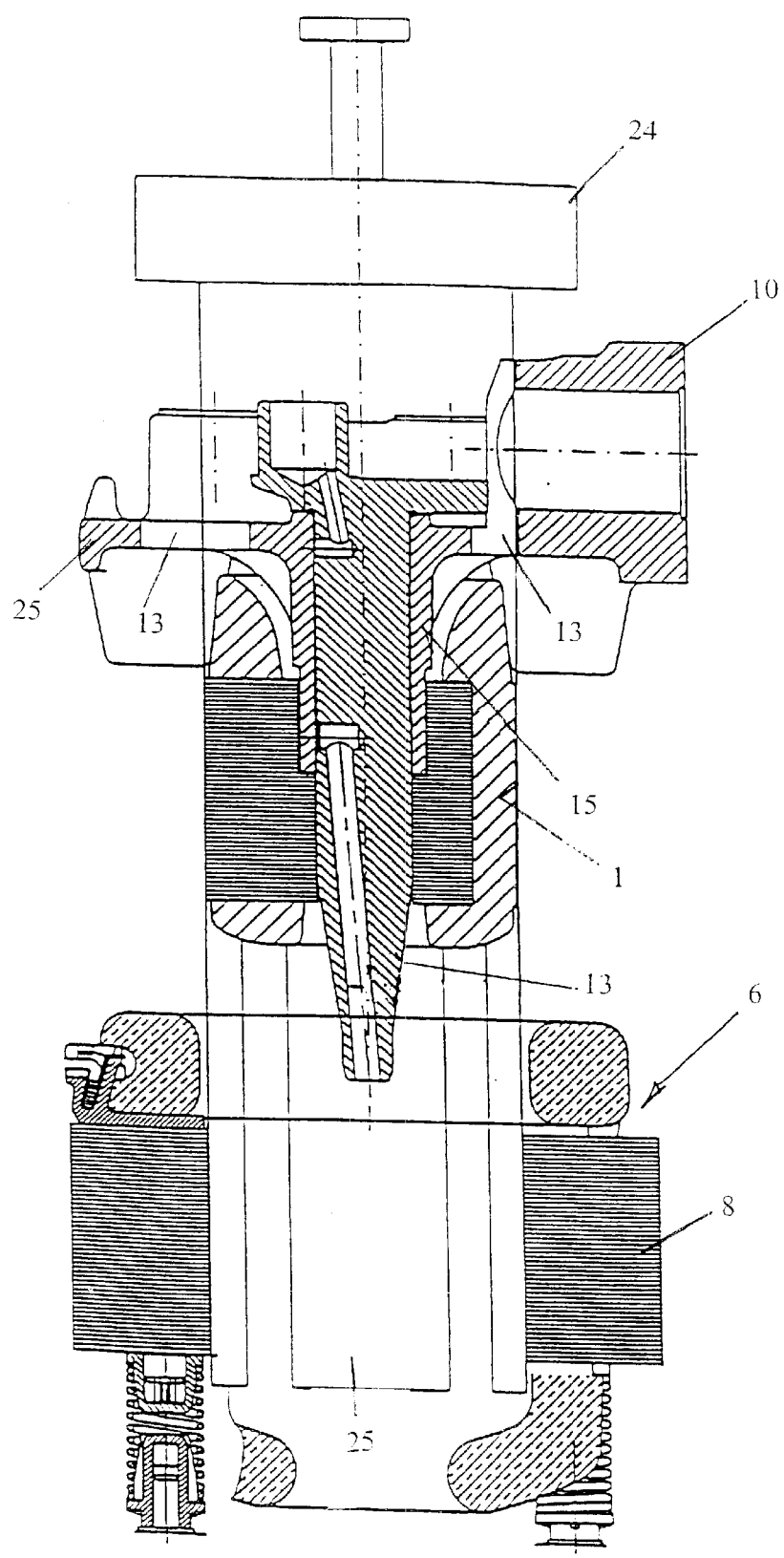
FIG. 4 shows a sectional view of the position of rotor, compressor, crankshaft and cylinder housing in the application of the method in accordance with the invention for assembling the compressor.

FIG. 4 shows the positioning of the individual components in a first method for mounting in accordance with the invention. Rotor 1 is fixed on crankshaft 3, with the same being held in extension 25 in its bearing 15. A mounting tool 25 is inserted through the break-throughs 13 in extension 25, which tool simultaneously narrowly encompasses the rotor 1. The cylindrical jacket of the mounting tool 24 is placed with its lower end into the centric stator bore, so that after pushing down rotor 1, jointly with the crankshaft 3 and the cylinder housing 10 plus extension 25, the rotor 1 is centred in the stator bore and the stator 8 can be fixed with the cylinder housing 10 in the known manner. As an alternative, the individual components can be mounted by holding the stator in a fixed position and displacement of the rotor in a perpendicular plane of the rotor axis. This method helps to define the exact center of the stator bore in which the rotor has to be mounted. This method can preferably be used in computerized positioning means.

What is claimed is:

1. A compressor hermetically encapsulated in a compressor housing for use in small-size refrigerating installations, which comprises
   (a) a cylinder housing including an extension,
   (b) a crankshaft held in the extension and having an axis extending perpendicularly to an axis of the cylinder housing,
   (c) an electromotor including
      (1) a rotor and
      (2) a stator surrounding the rotor, the rotor and the stator defining an annular air gap therebetween, the crankshaft projecting from the cylinder housing extension through an end face of the electromotor facing the cylinder housing extension and into a central bore in the rotor, and the crankshaft being affixed to the rotor, and
   (d) the cylinder housing extension defining a plurality of breakthroughs surrounding the crankshaft axis through which a mounting tool fitting into the annular air gap may be inserted.

2. The compressor of claim 1, further comprising a resilient support for the electromotor arranged at an end face of the electromotor remote from the cylinder housing extension.

3. The compressor of claim 1, wherein the breakthroughs are aligned with the annular gap.

4. A method for assembling a compressor hermetically encapsulated in a compressor housing for use in small-size refrigerating installations, which compressor comprises a cylinder housing including an extension, a crankshaft held in the extension and having an axis extending perpendicularly to an axis of the cylinder housing, an electromotor including a rotor and a stator surrounding the rotor, the rotor and the stator defining an annular air gap therebetween, the crankshaft projecting from the cylinder housing extension through an end face of the electromotor facing the cylinder housing extension and into a central bore in the rotor, and the crankshaft being affixed to the rotor, and the cylinder housing extension defining a plurality of breakthroughs surrounding the crankshaft axis, which comprises the steps of
   (a) introducing the crankshaft into a bearing in the cylinder housing extension and affixing the crankshaft to the rotor,
   (b) inserting a mounting tool fitting into the annular air gap through the breakthroughs to position the rotor in relation to the stator and then to position the stator in relation to the cylinder housing extension, and
   (c) removing the mounting tool in a direction opposite the one in which it was inserted.

5. A method for assembling a compressor hermetically encapsulated in a compressor housing for use in small-size refrigerating installations, which compressor comprises a cylinder housing including an extension, a crankshaft held in the extension and having an axis extending perpendicularly to an axis of the cylinder housing, an electromotor including a rotor and a stator having a central bore and surrounding the rotor, the rotor and the stator defining an annular air gap therebetween, the crankshaft projecting from the cylinder housing extension through an end face of the electromotor facing the cylinder housing extension and into a central bore in the rotor, and the crankshaft being affixed to the rotor, which comprises the steps of
   (a) introducing the crankshaft into a bearing in the cylinder housing extension and affixing the crankshaft to the rotor,
   (b) holding the stator in a fixed position and introducing the crankshaft to which the rotor is affixed through the end face into the central bore of the stator,
   (c) displacing the rotor in a first direction in a plane perpendicular to the crankshaft axis along a straight line until the rotor touches the interior wall of the central stator bore,
   (d) displacing the rotor in a second direction opposite to the first direction and measuring the path of displacement until the rotor touches in the interior wall of the central stator bore,
   (e) positioning a center point of the rotor in a center of the measured chord of the central stator bore,
   (f) displacing the rotor in a third direction normal to the direction of the measured chord until the toror touches the interior wall of the central stator bore,
   (g) displacing the rotor in a fourth direction opposite to the third direction and measuring the path of displacement until the rotor touches in the interior wall of the central stator bore,
   (h) positioning a center point of the rotor in a center of the measured chord of the central stator bore, and
   (i) fixing the stator to the cylinder housing including the extension.

* * * * *